(12) United States Patent
Koiso et al.

(10) Patent No.: US 8,742,321 B2
(45) Date of Patent: Jun. 3, 2014

(54) ORIGIN LOCATION DETECTION CIRCUIT

(75) Inventors: Ryuichi Koiso, Tochigi (JP); Toru Yaku, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 142 days.

(21) Appl. No.: 13/227,591

(22) Filed: Sep. 8, 2011

(65) Prior Publication Data

US 2012/0085896 A1    Apr. 12, 2012

(30) Foreign Application Priority Data

Oct. 12, 2010    (JP) .................................. 2010-229953

(51) Int. Cl.
 *G01D 5/34*    (2006.01)
 *G01B 11/14*   (2006.01)
 *H03M 1/22*    (2006.01)

(52) U.S. Cl.
 USPC ................. 250/231.13; 250/231.16; 356/616; 341/11

(58) Field of Classification Search
 USPC ........... 250/231.13–231.18, 233, 236, 237 R, 250/237 G; 341/11, 13, 31; 356/616, 617
 See application file for complete search history.

(56) References Cited

U.S. PATENT DOCUMENTS

| | | |
|---|---|---|
| 4,152,579 A | 5/1979 | Feinland |
| 4,636,079 A | 1/1987 | Rieder et al. |
| 4,678,908 A | 7/1987 | LaPlante |
| 6,285,023 B1 | 9/2001 | Uehira |
| 6,342,697 B1 | 1/2002 | Nagai et al. |
| 7,034,948 B2 * | 4/2006 | Tamiya et al. ................ 356/499 |
| 7,541,852 B2 * | 6/2009 | Johnson ........................ 327/175 |

FOREIGN PATENT DOCUMENTS

| | | |
|---|---|---|
| DE | 19913139 | 9/1999 |
| DE | 19945167 | 3/2000 |
| EP | 0145698 | 6/1985 |
| JP | 2000-97726 | 4/2000 |
| JP | 2007-240348 | 9/2007 |

OTHER PUBLICATIONS

Germany Office action, dated Mar. 27, 2013 along with an english translation thereof.

* cited by examiner

*Primary Examiner* — Kevin Pyo
*Assistant Examiner* — Don Williams
(74) *Attorney, Agent, or Firm* — Greenblum & Bernstein, P.L.C.

(57) ABSTRACT

An origin location detection circuit in an encoder. The encoder includes a scale on which an origin pattern indicating an origin is provided and a detection head relatively displaceable with respect to the scale. The origin location detection circuit includes a comparator for generating an origin signal indicating a location of the origin from an output voltage signal, which is output from a detector of the detection head and has been affected by involvement of the origin pattern; a DC voltage detection circuit smoothing the output voltage signal; and a differential amplifier circuit performing differential amplification of the output voltage signal and a DC voltage signal output from the DC voltage detection circuit. A differential amplifier signal of the differential amplifier circuit is input to the comparator.

11 Claims, 5 Drawing Sheets

RELATED ART

ORIGIN LOCATION DETECTION CIRCUIT

CROSS-REFERENCE TO RELATED APPLICATIONS

The present application claims priority under 35 U.S.C. §119 of Japanese Application No. 2010-229953, filed on Oct. 12, 2010, the disclosure of which is expressly incorporated by reference herein in its entirety.

BACKGROUND OF THE INVENTION

1. Field of the Invention

The present invention relates to an origin location detection circuit in an encoder. The encoder includes a scale on which an origin pattern indicating an origin is provided, and a detection head relatively displaceable with respect to the scale. The origin location detection circuit includes a comparator for generating an origin signal indicating a location of the origin from an output voltage signal, which is output from a detector of the detection head and has been affected by involvement of the origin pattern. In particular, the present invention relates to an origin location detection circuit capable of improving reproducibility of a detection location of the origin signal even when there is fluctuation in a DC component of the output voltage signal.

2. Description of Related Art

Conventionally, a detection method of an origin location in a photoelectric encoder, such as the one disclosed in Japanese Patent Laid-Open Publication No. 2000-97726, has been proposed. In such a detection method of the origin location, for example, when an LED as a light source and a phototransistor as a light receiver (detector) are used, an origin location detection circuit as illustrated in FIG. 10(A) is a basic configuration. In FIG. 10(A), a resistor R2, which acts as a load, is connected between an emitter end (output end) of the phototransistor, which is a light receiver 26, and the ground. The output end of the phototransistor is connected to a minus input terminal of a comparator 32, and a threshold voltage Zsh, obtained by dividing a power-supply voltage VDD using resistors R10 and R11, is input to a plus input terminal of the comparator 32. The threshold voltage Zsh does not change. Therefore, in this origin location detection circuit, an output voltage signal φZ (which has been affected by the involvement of the origin pattern) output from the light receiver 26 is compared with the threshold voltage Zsh, which is of a constant value, at the comparator 32, and is converted to a digital signal, and thereby an origin signal PZ indicating an origin location is generated. The origin signal PZ from the origin location detection circuit is used, during power-on, to recognize an absolute location within a movement range of a control machine (movement stage) on which the detection head is mounted.

However, as illustrated by a dashed line in FIG. 10(B), a DC component of the output voltage signal φZ fluctuates (ΔφZ) under the influence of degradation of the LED and phototransistor, fluctuation in ambient temperature, fluctuation in the power-supply voltage VDD, location changes over time of the scale and detection head of the photoelectric encoder (fluctuation in a control machine or in a bonding state between the detection head and the control machine), and the like (the DC component of the output voltage signal φZ means an approximately DC voltage component containing a moderate voltage fluctuation excluding fluctuation in the output voltage signal φZ at the origin location (this includes fluctuations in other transient output voltage signals φZ of relatively fast periods)). Therefore, the origin signal PZ changes, and, as a result, a detection location deviation DV of the origin signal occurs. Such a circumstance has been newly discovered by the inventors (a symbol TSW in FIG. 10(B) indicates a two-phase sinusoidal signal generated by an incremental pattern (INC pattern) of the scale).

It is also conceivable to follow the fluctuation in the DC component by using a high pass filter disclosed in Japanese Patent Laid-Open Publication No. 2007-240348. In this case, a frequency component obtained when detecting an origin signal using the high pass filter of Japanese Patent Laid-Open Publication No. 2007-240348 must be separated from a frequency component related to the DC component. However, in a case where a location of an origin is actually completely unknown during power-on, a detection operation is extremely slowly performed when detecting the origin location of an encoder, which is not limited to a photoelectric type. In such a case, a frequency component obtained when detecting an origin signal contains a significantly low frequency component. Therefore, it is difficult to separate the frequency component obtained when detecting an origin signal using the above described high pass filter and the frequency component related to the DC component. That is, using the technology of Japanese Patent Laid-Open Publication No. 2007-240348, it is difficult to surely avoid the detection location deviation of the origin signal.

SUMMARY OF THE INVENTION

The present invention has been devised to address the above describe circumstances. A purpose of the present invention is to provide an origin location detection circuit capable of surely improving reproducibility of the detection location of the origin signal even when fluctuation exists in the DC component of the output voltage signal which is output from the detector and which has been affected by involvement of the origin pattern.

One aspect of the present invention is an origin location detection circuit in an encoder. The encoder includes a scale on which an origin pattern indicating an origin is provided and a detection head relatively displaceable with respect to the scale. The origin location detection circuit includes a comparator for generating an origin signal indicating a location of the origin from an output voltage signal which is output from a detector of the detection head and which has been affected by involvement of the origin pattern; a DC voltage detection circuit smoothing the output voltage signal; and a differential amplifier circuit performing differential amplification of the output voltage signal and a DC voltage signal output from the DC voltage detection circuit. In this origin location detection circuit, a differential amplifier signal of the differential amplifier circuit is input to the comparator. By providing such an origin location detection circuit, the above purpose is achieved. An operation charging the output voltage signal during a specific period of time is also included in "smoothing the output voltage signal".

According to another aspect of the present invention, the encoder is a photoelectric encoder, which includes a light source and a light receiver, the light source irradiating the origin pattern with light, and the light receiver, as the detector, receiving light from the origin pattern.

According to another aspect of the present invention, the DC voltage detection circuit includes a low pass filter configured with a resistor and a capacitor, the resistor allowing the output voltage signal to pass, and the capacitor being connected between an output end of the resistor and the ground.

According to another aspect of the present invention, the DC voltage detection circuit further includes an OP amplifier wired in a form of a voltage follower at a rear side of the low pass filter, and the DC voltage signal is output from the OP amplifier.

According to another aspect of the present invention, the DC voltage detection circuit includes an analog switch and a capacitor at a front side, and an OP amplifier at a rear side of the capacitor, the analog switch allowing the output voltage signal to pass, the capacitor being connected between an output end of the analog switch and the ground, the OP amplifier being wired in a form of a voltage follower. On/Off of the analog switch is controlled using a power-on reset signal that resets the encoder, and the DC voltage signal is output from the OP amplifier.

According to the present invention, improvement in reproducibility of the detection location of the origin signal surely becomes possible, even when fluctuation exists in the DC component of the output voltage signal, which is output from the detector and which has been affected by involvement of the origin pattern.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

In the following, with reference to the drawings, an embodiment of the present invention is explained in detail.

First, a configuration of an encoder having an origin location detection circuit according to a first embodiment of the present invention is explained in the following using FIG. 1.

Figure 1:
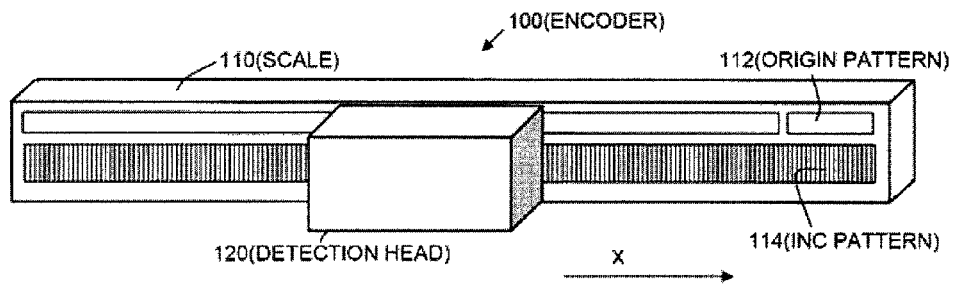
FIG. 1 is a diagram illustrating an outline of an example of an encoder having an origin location detection circuit according to a first embodiment of the present invention.

As FIG. 1 illustrates, an encoder 100 is a reflection type photoelectric linear encoder, and includes a scale 110 and a detection head 120, the detection head 120 being relatively displaceable with respect to the scale 110. The scale 110 and the detection head 120 are separable, constituting an encoder of a separate-type.

As FIG. 1 illustrates, an origin pattern 112 and an INC pattern 114, extending along an X direction (relatively displaceable direction), are provided on the scale 110. The origin pattern 112 is constituted by a reflection pattern having a slit (slit width W), which is an only place that is permeable and indicates an origin location. The INC pattern 114 is constituted by an optical lattice arranged along the X direction at regular intervals. The INC pattern 114 reflects light using the optical lattice.

Figure 2:
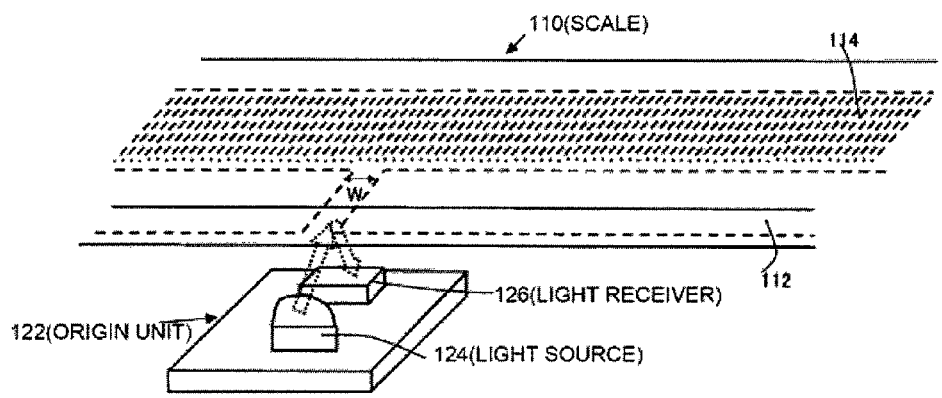
FIG. 2 is a schematic diagram illustrating a relation between an origin unit in a detection head and an origin pattern of a scale illustrated in FIG. 1.

As FIG. 1 illustrates, the detection head 120 is arranged to face in a non-contact manner the origin pattern 112 and INC pattern 114 of the scale 110. The detection head 120 includes, toward the INC pattern 114, a light source, a lens, and a plurality of light receiving arrays arranged along the X direction (none of which are shown in the drawings). Further, as FIG. 2 illustrates, the detection head 120 includes, toward the origin pattern 112, an origin unit 122. The origin unit 122 includes a light source 124 and a light receiver 126 (detector). The light source 124 is, for example, an LED, and has a characteristic property that its output decreases as temperature rises. The light source 124 irradiates the origin pattern 112 with light. The light receiver 126 is, for example, an NPN type phototransistor, which has an amplifier circuit and of which output increases according to an amount of light received. Therefore, the light receiver 126 is of a small size, but has a characteristic property that a gain of light received rises as temperature rises. The light receiver 126, as a detector, receives light from the origin pattern 112. That is, the light receiver 126 receives light that has been affected by involvement of the origin pattern 112.

Figure 3:
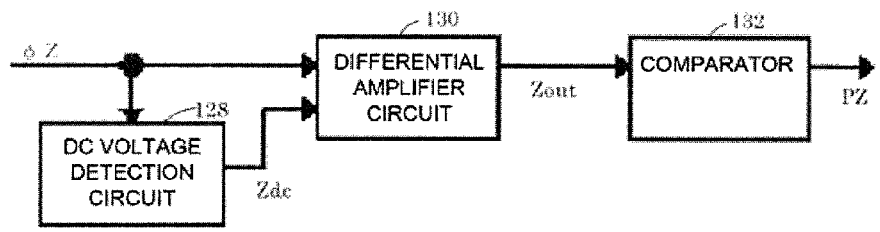
FIG. 3 is a schematic block diagram illustrating an example of an origin location detection circuit according to the first embodiment of the present invention.

Further, provided in the detection head 120 are an origin location detection circuit and a location detection circuit. The origin location detection circuit processes an output voltage signal $\phi Z$, which is output from the light receiver 126 of the origin unit 122 and has been affected by involvement of the origin pattern 112, to generate and output an origin signal PZ indicating a location of an origin. The location detection circuit processes an output from the light receiving array to obtain a relative location. Here, explanation of the location detection circuit is omitted. As FIG. 3 and FIG. 4 illustrate, the origin location detection circuit includes a DC voltage detection circuit 128, a differential amplifier circuit 130, a comparator 132, and an inverter INV.

Figure 4:
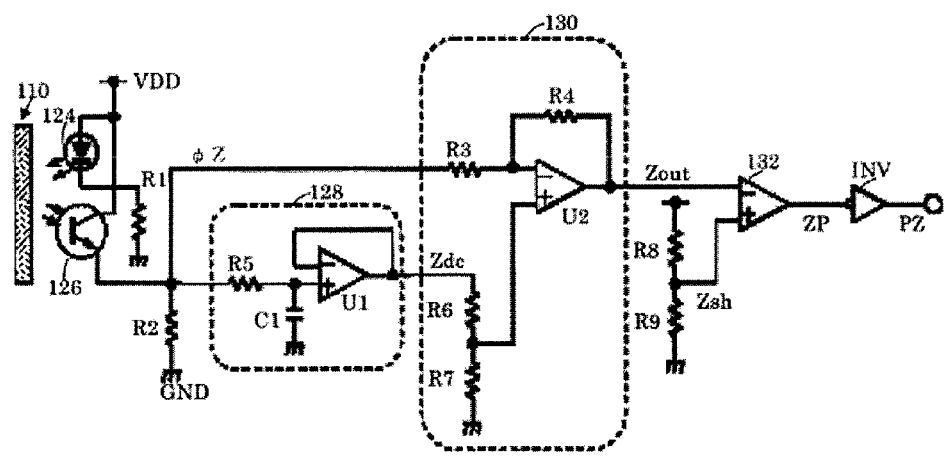
FIG. 4 is a schematic diagram illustrating a representative circuit diagram of FIG. 3.

As FIG. 4 illustrates, the DC voltage detection circuit 128 smoothes the output voltage signal $\phi Z$ and extracts a DC component of the output voltage signal $\phi Z$ (the DC component means an approximately DC voltage component containing a moderate voltage fluctuation, excluding fluctuation in the output voltage signal $\phi Z$ at the origin location (this includes fluctuations in other transient output voltage signals $\phi Z$ of relatively fast periods)).

Specifically, as FIG. 4 illustrates, the DC voltage detection circuit 128 includes a low pass filter at a front side and an operational (OP) amplifier U1 at a rear side of the low pass filter.

Figure 5:
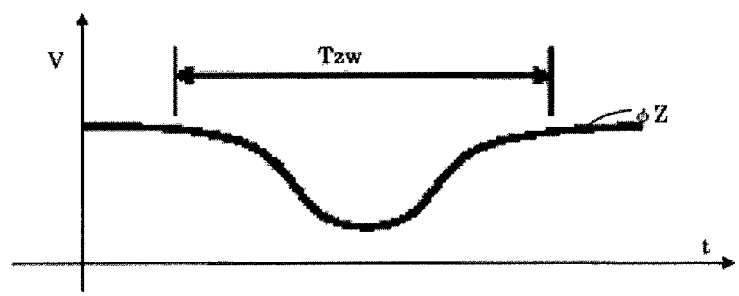
FIG. 5 is a schematic diagram illustrating an outline of a $\phi Z$ signal of FIG. 3.

The low pass filter is configured with a resistor R5, which is connected in series with the output voltage signal φZ to allow the output voltage signal φZ to pass, and a capacitor C1, which is connected between an output end of the resistor R5 and the ground (GND) (connected in parallel with the output voltage signal φZ). The low pass filter has a cutoff frequency fc (Equation (1)) for cutting fluctuation in the output voltage signal φZ at the origin location. In the present embodiment, as Equation (2) indicates, the product of the resistor R5 and the capacitor C1, which define the cutoff frequency fc, are set to be greater than a phototransistor output signal duration Tzw shown in FIG. 5. The phototransistor output signal duration Tzw can be obtained from the slit width W of the origin pattern 112 (FIG. 2) and a moving speed V of the detection head 120 during an origin detection, according to Equation (3).

[Formula 1]

$$fc = \frac{1}{2\pi * R5 * C1} \quad (1)$$

$$R5 * C1 > Tzw \quad (2)$$

$$Tzw = W \div V \quad (3)$$

The OP amplifier U1 at a rear side of the capacitor C1 is wired in a form of a voltage follower in which an inverting input terminal of the OP amplifier U1 is directly connected to an output terminal of the OP amplifier U1. A non-inverting input terminal of the OP amplifier U1 is connected to the output end of the resistor R5. From the output terminal of the OP amplifier U1, a DC voltage signal Zdc is output. The OP amplifier U1, ideally, has an infinite input impedance and a zero output impedance. Therefore, the OP amplifier U1 is able to separate a connection between impedances of the circuits before and after the OP amplifier U1.

As FIG. 4 illustrates, the differential amplifier circuit 130 includes resistors R3, R4, R6, and R7 and an OP amplifier U2. The output voltage signal φZ is input to an inverting input terminal of the OP amplifier U2 via the resistor R3. The inverting input terminal is connected to an output terminal of the OP amplifier U2 via the resistor R4. On the other hand, a voltage obtained by dividing the DC voltage signal Zdc using the resistors R6 and R7 is input to a non-inverting amplifier terminal of the OP amplifier U2. Here, relations shown in Equation (4) hold between the resistors R3, R4, R6, and R7. A gain of the differential amplifier circuit 130 is determined by a resistance ratio R3/R4 (=R6/R7). That is, the differential amplifier circuit 130 performs differential amplification of the output voltage signal φZ and the DC voltage signal Zdc output from the DC voltage detection circuit 128. From the differential amplifier circuit 130, a differential amplifier signal Zout having a DC component of 0 V (measured relative to 0 V).

$$R3=R6, R4=R7 \quad (4)$$

As FIG. 4 illustrates, a minus terminal of the comparator 132 is connected to an output end of the differential amplifier circuit 130. That is, the differential amplifier signal Zout of the differential amplifier circuit 130 is input to the comparator 132. On the other hand, a threshold voltage Zsh obtained by dividing a power-supply voltage VDD using resistors R8 and R9 is input to a plus terminal of the comparator 132. Then, the differential amplifier signal Zout and the threshold voltage Zsh are compared at the comparator 132, and a signal ZP for generating an origin signal PZ, which indicates the location of the origin, is output. That is, the comparator 132 is used for generating the origin signal PZ, which indicates the location of the origin, from the output voltage signal φZ, which has been affected by involvement of the origin pattern 112.

As FIG. 4 illustrates, an output terminal of the comparator 132 is connected to an input terminal of the inverter INV. That is, the signal ZP is inverted at the inverter INV and becomes the origin signal PZ.

A limiting resistor R1 is connected between an LED, which is the light source 124, and the ground. A load resistor R2 is connected between an emitter terminal of a phototransistor, which is the light receiver 126, and the ground.

Next, operation of the origin location detection circuit is explained using FIG. 4 and FIGS. 6(A)-6(C).

When light from the light source 124 irradiates the origin pattern 112 of the scale 110, light is reflected only by a reflection pattern portion, and, at the phototransistor, which is the light receiver 126, an electrical current corresponding to an amount of light received flows from the emitter terminal of the phototransistor to the resistor R2. A voltage across the resistor R2 becomes the output voltage signal φZ illustrated in FIG. 6(A).

The output voltage signal φZ is branched. One portion of the branched output voltage signal φZ is input to the DC voltage detection circuit 128. The output voltage signal φZ is smoothed by the low pass filter at the front side of the DC voltage detection circuit 128, and only the DC component of the output voltage signal φZ is input to the non-inverting input terminal of the OP amplifier U1 at the rear side. In this case, the OP amplifier U1 is wired in a form of a voltage follower. Therefore, the DC component applied to the non-inverting input terminal of the OP amplifier U1 is output as is from the output terminal of the OP amplifier U1 as the DC voltage signal Zdc (=DC component) illustrated in FIG. 6(A). Fluctuation (ΔZdc) in the DC component (DC voltage signal Zdc) obtained at the DC voltage detection circuit 128 follows fluctuation (ΔφZ) in the output voltage signal φZ, which is slower than variation of the output voltage signal φZ due to the slit width W. That is, a fluctuation range of the output voltage signal φZ and a fluctuation range of the DC voltage signal Zdc are nearly identical (ΔφZ≈ΔZdc).

Another portion of the branched output voltage signal φZ is input to one input terminal of the differential amplifier circuit 130. The DC voltage signal Zdc is input to another input terminal. Here, as described above, even when the output voltage signal φZ fluctuates, the DC voltage signal Zdc also fluctuates with a nearly identical fluctuation range (ΔφZ≈ΔZdc). Therefore, even when the output voltage signal φZ fluctuates, the differential amplifier signal Zout (FIG. 6(A)) having a DC component of 0 V (measured relative to 0 V) is output from the differential amplifier circuit 130.

Figure 6A:
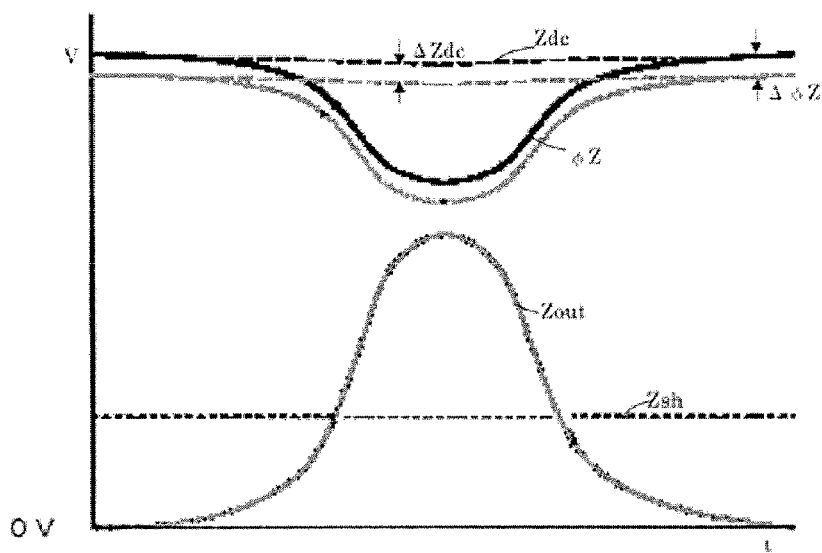
FIGS. 6(A)-6(C) are schematic diagrams illustrating representative shapes of signals of terminals shown in FIG. 3.
Figure 6B:
Figure 6C:
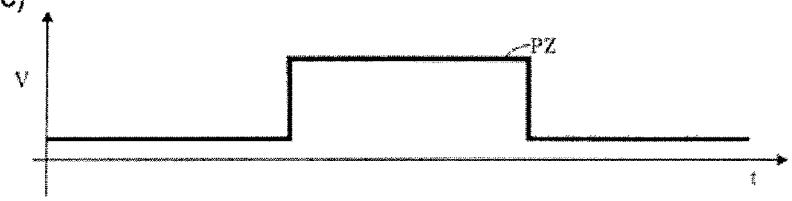

The differential amplifier signal Zout and the threshold voltage Zsh are input to the comparator 132, and the signal ZP as illustrated in FIG. 6(B) is obtained. The signal ZP, being input to the inverter INV, is inverted, and becomes the origin signal PZ illustrated in FIG. 6(C).

As described above, the present embodiment includes, unprecedentedly, the DC voltage detection circuit 128 smoothing the output voltage signal φZ, and the differential amplifier circuit 130 performing differential amplification of the output voltage signal φZ and the DC voltage signal Zdc. Therefore, even when there is fluctuation (ΔZdc) in the DC component of the output voltage signal φZ, generated under the influence of degradation of the LED and the phototransistor, fluctuation in ambient temperature, fluctuation in power-supply voltage VDD, location changes over time of the scale 110 and the detection head 120, and the like, the differential amplifier signal Zout output from the differential amplifier circuit 130 via the DC voltage detection circuit 128 can be formed as a signal rising up from 0 V, measured relative to 0 V. That is, in the present embodiment, improvement can be achieved in the reproducibility of the detection location of the origin signal PZ (which is not periodic, but isolated) obtained from the differential amplifier signal Zout.

In this case, the encoder 100 is a photoelectric encoder, and includes the light source 124 irradiating the origin pattern 112 with light, and the light receiver 126 as a detector receiving light from the origin pattern 112. Moreover, the light source 124 is an LED, and the light receiver 126 is an NPN type phototransistor. Therefore, even both of the light source 124 and the light receiver 126 show large temperature dependency, the influence of the temperature dependency can be eliminated and the origin location detection circuit can be made of small size and at low cost.

Further, the DC voltage detection circuit 128 includes the low pass filter configured with the resistor R5, which allows the output voltage signal $\phi Z$ to pass, and the capacitor C1, which is connected between the output end of the resistor R5 and the ground. Therefore, the DC component (DC voltage signal Zdc) of the output voltage signal $\phi Z$ can be extracted using a simple and small circuit. In addition, the DC detection circuit 128 includes the OP amplifier U1 wired in a form of voltage follower at the rear side of the capacitor C1. The DC voltage signal Zdc is output from the OP amplifier U1. That is, the OP amplifier U1 is able to separate a connection between impedances of the circuits before and after the OP amplifier U1. Therefore, for example, the resistor R5 and the capacitor C1 that define the low pass filter can be simply and optimally specified, without being restricted by the resistors R6 and R7 of the differential amplifier circuit 130.

That is, according to the present embodiment, improvement surely becomes possible in the reproducibility of the detection location of the origin signal PZ, even when fluctuation exists in the DC component of the output voltage signal $\phi Z$, which is output from the light receiver 126 and has been affected by involvement of the origin pattern 112.

With respect to the present invention, the first embodiment has been described. However, the present invention is not limited to the first embodiment. That is, improvements and modifications in design are possible within the scope without departing from the spirit of the present invention.

Figure 7:
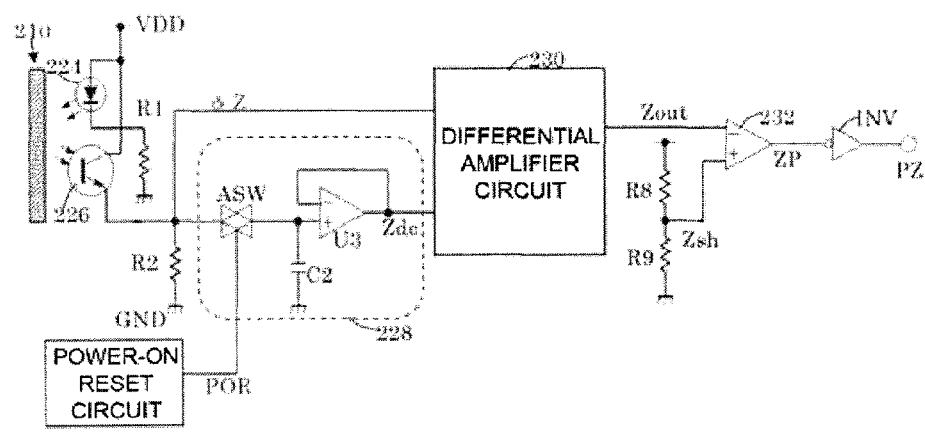
FIG. 7 is a schematic diagram illustrating a representative circuit diagram of an origin location detection circuit according to a second embodiment of the present invention.
Figure 8:
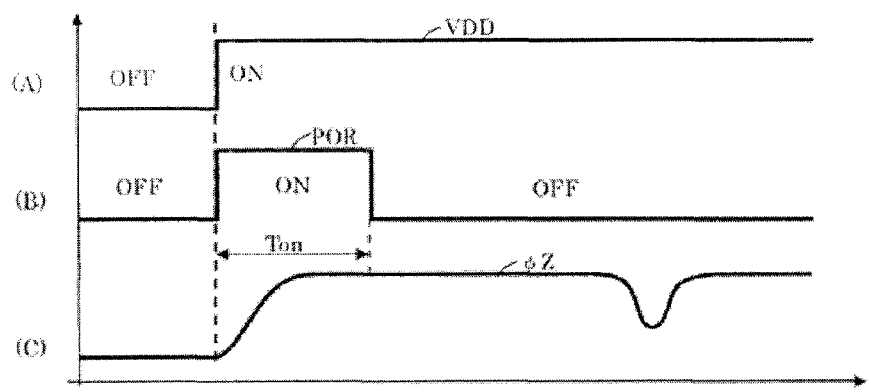
FIG. 8 is a schematic diagram illustrating a relation between a power-supply voltage, a power-on reset signal, and a $\phi Z$ signal shown in FIG. 7.

For example, in the first embodiment, the DC voltage detection circuit 128 includes a combination of the low pass filter and the voltage follower using the OP amplifier U1. However, the present invention is not limited to this. For example, a second embodiment as illustrated in FIG. 7 and FIG. 8 is also possible. In the present embodiment, a DC voltage detection circuit 228 includes, at a front side, an analog switch ASW, which allows the output voltage signal $\phi Z$ to pass, and a capacitor C2, which is connected between an output end of the analog switch ASW and the ground. The DC voltage detection circuit 228 also includes an OP amplifier U3 wired in a form of a voltage follower at a rear side of the capacitor C2. Here, On/Off of the analog switch ASW is controlled by a power-on reset signal POR that resets the encoder. From the OP amplifier U3, the DC voltage signal Zdc is output.

In the present embodiment, the power-on reset signal POR is output from a power-on reset circuit provided in a control machine outside the encoder (however, the power-on reset circuit may also be provided inside the encoder). As FIG. 8 illustrates, the power-on reset signal POR is turned on after the power-supply voltage VDD of the encoder is turned on and during a period until the output voltage signal $\phi Z$ becomes a constant value. This turned-on time Ton is duration of time (10 ms or more) that allows the DC component of the output voltage signal $\phi Z$ to sufficiently charge the capacitor C2, for a case of a usual power-on reset signal POR. Specifically, when an On-resistance of the analog switch ASW is Rsw, and when a difference between the DC voltage signal Zdc and a charging voltage Zc2 charging the capacitor C2 becomes less than or equal to an output noise level Vn of the OP amplifier U3, the time Ton as a time for charging the capacitor C2 is obtained using Equation (5).

[Formula 2]

$$Zdc - Zc2 \le Vn \qquad (5)$$

$$Zdc - Zdc\left(1 - e^{-\frac{Ton}{Rsw*C2}}\right) \le Vn$$

$$Ton \ge -Rsw*C2*\ln\frac{Vn}{Zdc}$$

The OP amplifier U3 wired in a form of a voltage follower performs the same function as the OP amplifier U1 described in the first embodiment. That is, the OP amplifier U3 can output the charging voltage Zc2 as the DC voltage signal Zdc without affecting the charging voltage Zc2 ($\approx$the DC voltage signal Zdc) charged on the capacitor C2.

That is, in the present embodiment, the power-on reset circuit is generally always provided, and the power-on reset signal output from the power-on reset circuit can be diverted. Therefore, the DC voltage detection circuit 228 can be configured to be simple and small-scaled. In the present embodiment, the DC voltage signal Zdc can be renewed each time the power-on reset signal POR is generated. That is, when the encoder is powered on, or even after the encoder is powered on when the power-on reset signal POR is being regularly output, the DC voltage signal Zdc can be regularly renewed. That is, in response to the renewal of the DC voltage signal Zdc, an origin location that follows the fluctuation in the output voltage signal $\phi Z$ can be obtained, and improvement in the reproducibility of the detection location of the origin signal PZ surely becomes possible.

Further, in the first embodiment, the DC voltage signal is output via the OP amplifier U1, which is wired in a form of a voltage follower. However, the present invention is not limited to this. The OP amplifier U1 may be absent. In that case, the number of parts can be reduced, thereby promoting cost reduction and downsizing of the origin location detection circuit.

Further, in the above described embodiment, the slit at the one place that is permeable in the origin pattern is used to indicate the origin location. However, the present invention is not limited to this. For example, it is also possible that a plurality of origin locations are provided; it is also possible that only an origin location reflects light; and it is also possible that an edge, not a slit, is used to indicate an origin location.

Further, in the above described embodiment, the NPN type phototransistor is used as the light receiver. However, the present invention is not limited to this. For example, as the light receiver, it is possible to use a PNP type phototransistor, a photodiode, or the like.

Figure 9:
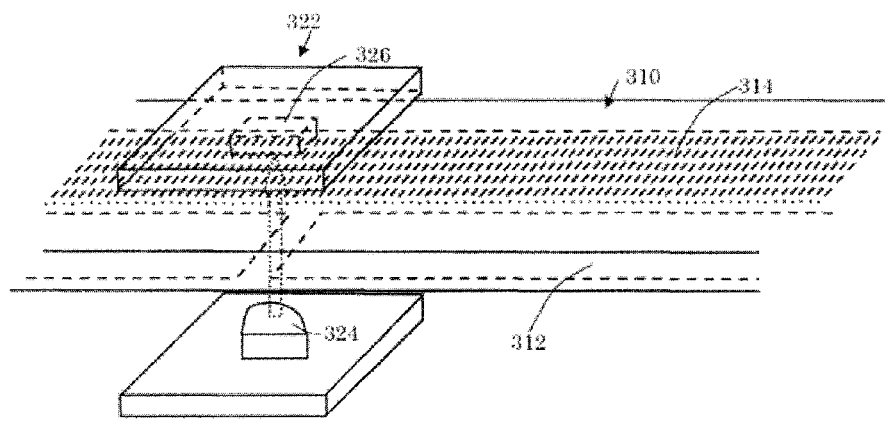
FIG. 9 is a schematic diagram illustrating a relation between an origin unit in a detection head and an origin pattern on a scale in an encoder having an origin location detection circuit according to a third embodiment of the present invention.
Figure 10A:
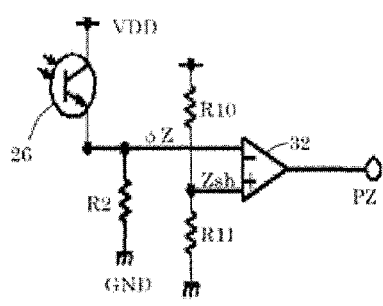
FIGS. 10(A) and 10(B) are schematic diagrams each illustrating a relation between an origin location detection circuit and signals according to a conventional technology.
Figure 10B:
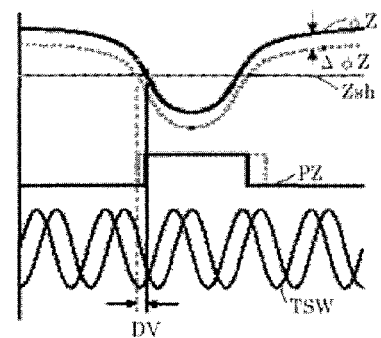

Further, in the above described embodiment, the origin location detection circuit according to the present invention is applied to the reflection type photoelectric linear encoder (of a separate type). However, the present invention is not limited to this. For example, the present invention is also applicable to a reflection type photoelectric linear encoder of an integrated type. Or, as in a third embodiment illustrated in FIG. 9, it is also possible that the origin location detection circuit according to the present invention is applied to a transmission type photoelectric linear encoder, in which an origin unit 322 is arranged so as to sandwich a scale 310.

Further, in the above embodiment, the present invention is applied to an incremental scale which is provided with an INC pattern configured with an optical lattice arranged at regular intervals. However, the present invention is not limited to this, but is also applicable to an absolute scale and the like, the absolute scale using a pseudo-random code and the like.

Further, the above described embodiment has been explained using the photoelectric linear encoder having a linear scale. However, the present invention is not limited to this. For example, the encoder may be a capacitive encoder or an electromagnetic inductive encoder. At the same time, the scale is not limited to a linear scale. The present invention is also applicable to a disc-shaped rotary encoder.

The origin location detection circuit according to the present invention is applicable to not only a photoelectric encoder, but also various encoders in which an origin location detection circuit is required.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An origin location detection circuit in an encoder, the encoder including a scale on which an origin pattern indicating an origin is provided and a detection head relatively displaceable with respect to the scale, the origin location detection circuit comprising:
a comparator configured to generate an origin signal indicating a location of the origin from an output voltage signal, which is output from a detector of the detection head and has been affected by the origin pattern;
a DC voltage detection circuit comprising a low-pass filter, the low-pass filter comprising a resistor directly coupled to the detector, the resistor allowing the output voltage signal to pass, the DC voltage detection circuit configured to smooth the output voltage signal; and
a differential amplifier circuit configured to perform differential amplification of the output voltage signal and a DC voltage signal output from the DC voltage detection circuit, wherein the comparator is further configured to receive a differential amplifier signal of the differential amplifier circuit.

2. The origin location detection circuit according to claim 1, wherein the encoder is a photoelectric encoder comprising:
a light source configured to irradiate the origin pattern with light; and
a light receiver, as the detector, configured to receive light from the origin pattern.

3. The origin location detection circuit according to claim 2, wherein the low pass filter further comprises a capacitor connected between an output end of the resistor and ground.

4. The origin location detection circuit according to claim 3, wherein the DC voltage detection circuit further comprises an operational amplifier wired as a voltage follower at a rear side of the low pass filter, and the DC voltage signal is output from the operational amplifier.

5. The origin location detection circuit according to claim 2, wherein the DC voltage detection circuit comprises an analog switch and a capacitor at a front side, and an operational amplifier at a rear side of the capacitor, the analog switch allowing the output voltage signal to pass, the capacitor being connected between an output end of the analog switch and ground, and the operational amplifier being wired in a form of a voltage follower, wherein On/Off of the analog switch is controlled using a power-on reset signal that resets the encoder, and the DC voltage signal is output from the operational amplifier.

6. The origin location detection circuit according to claim 1, wherein the low pass filter further comprises a capacitor connected between an output end of the resistor and ground.

7. The origin location detection circuit according to claim 6, wherein the DC voltage detection circuit further comprises an operational amplifier wired as a voltage follower at a rear side of the low pass filter, and the DC voltage signal is output from the operational amplifier.

8. The origin location detection circuit according to claim 1, wherein the DC voltage detection circuit comprises an analog switch and a capacitor at a front side, and an operational amplifier at a rear side of the capacitor, the analog switch allowing the output voltage signal to pass, the capacitor being connected between an output end of the analog switch and ground, and the operational amplifier being wired in a form of a voltage follower, wherein On/Off of the analog switch is controlled using a power-on reset signal that resets the encoder, and the DC voltage signal is output from the operational amplifier.

9. The origin location detection circuit according to claim 1, wherein:
the differential amplifier circuit comprises an operational amplifier and a plurality of resistors; and
the output voltage signal is input to an inverting input terminal of the operational amplifier via a first resistor of the plurality of resistors.

10. The origin location detection circuit according to claim 9, wherein the inverting input terminal is connected to an output terminal of the operational amplifier via a second resistor of the plurality of resistors.

11. The origin location detection circuit according to claim 10, wherein a voltage obtained by dividing the DC voltage signal using third and fourth resistors of the plurality of resistors is input to a non-inverting amplifier terminal of the operational amplifier.

* * * * *